United States Patent [19]
Braun

[11] Patent Number: 5,765,846
[45] Date of Patent: Jun. 16, 1998

[54] CURVE-LEANING VEHICLE

[75] Inventor: Dieter Braun, Stuttgart, Germany

[73] Assignee: Daimler-Benz AG, Stuttgart, Germany

[21] Appl. No.: 844,824

[22] Filed: Apr. 22, 1997

[30] Foreign Application Priority Data

May 15, 1996 [DE] Germany .................. 196 19 644.2

[51] Int. Cl.⁶ .................................................. B62D 9/02
[52] U.S. Cl. ...................... 280/112.2; 280/109; 280/111
[58] Field of Search ........................... 280/112.2, 109, 280/110, 111, 112.1, 113, 114, 115, 117, 118, 120

[56] References Cited

U.S. PATENT DOCUMENTS

| | | | |
|---|---|---|---|
| 2,353,503 | 7/1944 | Rost et al. | 280/112.1 |
| 2,787,473 | 4/1957 | Chiodo et al. | 280/112.2 |
| 3,089,710 | 5/1963 | Fiala | 280/112.2 |
| 4,351,410 | 9/1982 | Townsend | 280/112.2 |
| 4,515,390 | 5/1985 | Greenberg | 280/112.2 |
| 4,632,413 | 12/1986 | Fujita et al. | 280/112.2 |

FOREIGN PATENT DOCUMENTS

| | | | |
|---|---|---|---|
| 39 27 924 | 8/1990 | Germany. | |
| 1425099 | 9/1988 | U.S.S.R. | 280/112.2 |

Primary Examiner—Eric D. Culbreth
Attorney, Agent, or Firm—Klaus J. Bach

[57] ABSTRACT

In a curve-leaning vehicle whose vehicle body is leaning inwardly when the vehicle is negotiating a curve, the vehicle body is supported on an axle frame for pivoting about a longitudinal vehicle body axis. The axle frame has wheels which are independently supported by springs and includes an actuator for tilting the vehicle body inwardly when the vehicle is negotiating a curve. The actuator is operatively connected to the spring support structure for controlling spring forces such that the axle frame remains essentially level when the vehicle is negotiating a curve.

2 Claims, 2 Drawing Sheets

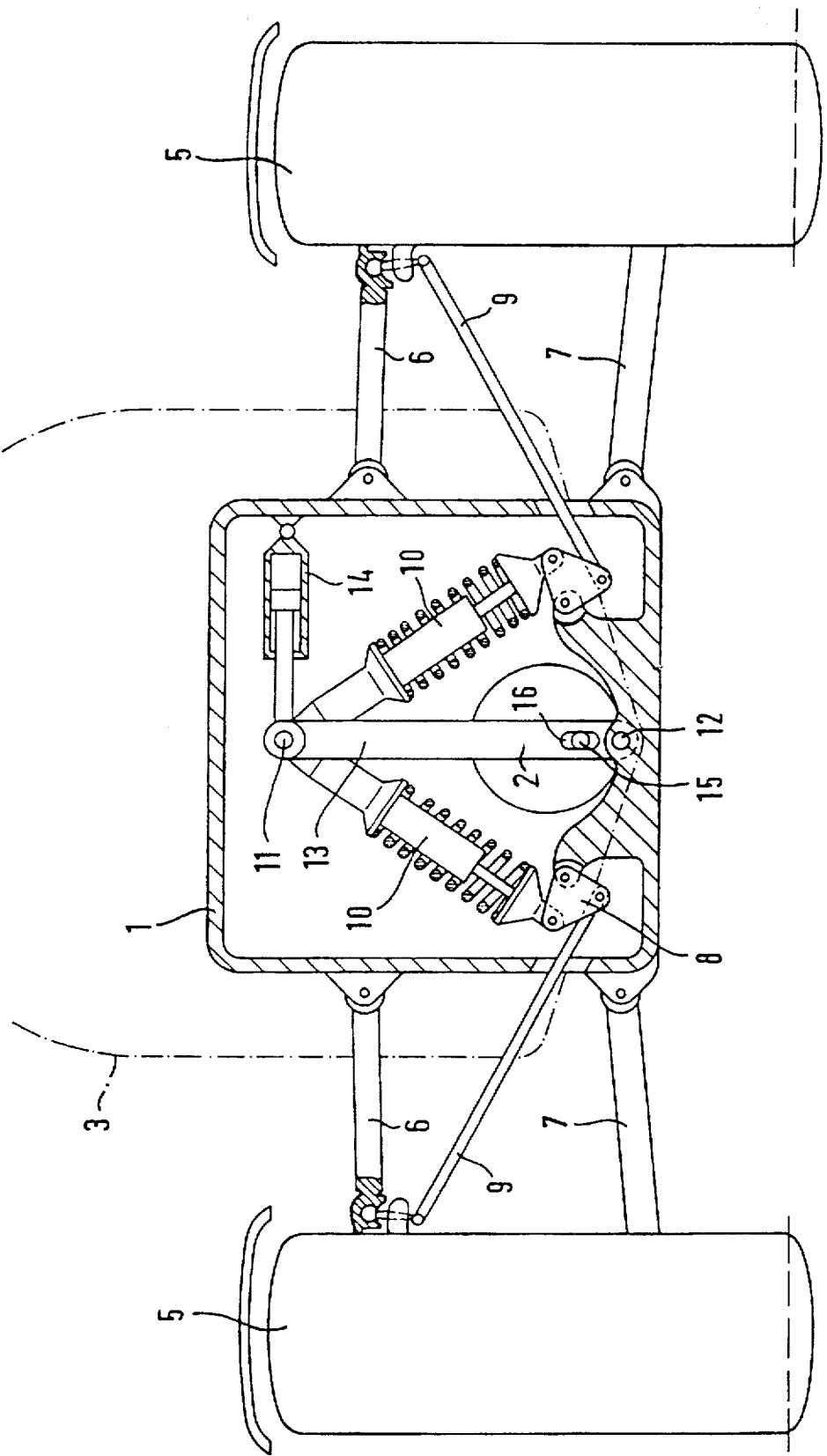

CURVE-LEANING VEHICLE

BACKGROUND OF THE INVENTION

The invention relates to a curve leaning vehicle whose body leans in a curve toward the inside of a curve relative to at least one of its axle units. The vehicle includes an axle frame which is part of the axle unit and on which the wheels of the axle unit are spring-supported. On the axle frame the body is supported pivotally about the longitudinal axis of the vehicle in such a way that its pivot position can be controlled by actuators disposed in the axle frame.

Curve-leaning vehicles are basically known. They are commonly used in railroad cars whose bodies lean inwardly when negotiating curves in order to compensate for the centrifugal forces acting on the passengers. This substantially improves the traveling comfort for the passengers. Basically, the same concepts are known and possible for road vehicles.

DE 39 27 924 C1, for example, discloses a motor vehicle wheel suspension with an axle frame which is mounted with regard to the vehicle body by support elements which are height-controllable as desired. The height control of the support elements serves to adjust for leaning of the vehicle body by tilting of the axle frame relative to the vehicle body particularly during acceleration and deceleration and during braking of the vehicle as well as to stabilize the body when the vehicle is negotiating curves. In this last case, the vehicle frame is raised and lowered relative to the axle frame to tilt the vehicle body about a longitudinal axis of the vehicle.

It is the object of the invention to provide such a vehicle with a particularly simple and advantageous design.

SUMMARY OF THE INVENTION

In a curve-leaning vehicle whose vehicle body is leaning inwardly when the vehicle is negotiating a curve, the vehicle body is supported on an axle frame for pivoting about a longitudinal vehicle body axis. The axle frame has wheels which are independently supported by spring means and includes an actuator for tilting the vehicle body inwardly when the vehicle is negotiating a curve. The actuator is operatively connected to a spring means support structure for controlling the spring forces such that, in a curve, the axle frame remains essentially parallel to the street surface.

With the arrangement according to the invention, the axle frame relative to which the vehicle body leans remains, even when the vehicle is negotiating curves, always in a leveled position relative to the road surface just as it does naturally on straight roads. It is not tilted by the centrifugal forces effective when negotiating curves. The controlled adjustments for the spring supports which stabilize the axle frame are achieved by coupling the actuator providing for the body leaning movement with the spring support structure.

This arrangement substantially simplifies the automatic control for the body leaning movement. In any case, it eliminates the need to take a pivoting of the axle frame in the opposite direction into consideration for the control of the body lean when the vehicle is negotiating a curve.

It is further advantageous that the wheels of the axle frame are always maintained in their normal positions which they have during straight forward movement of the vehicle even when the vehicle is negotiating a curve. As a result, the wheel suspension members are practically always in a position which is most advantageous for the kinematics of the wheel suspension.

In a preferred embodiment of the invention, the spring travel of each wheel of the axle frame is transferred, by means of a tie rod, to a shift lever which is linked by a spring support strut or element to a support member which is adjustable by an actuator. The spring support struts for both wheels may, in accordance with an advantageous embodiment of the invention, both be connected to the same adjustable support member. Preferably, this support member is a pivotally supported lever arm which extends vertically during straight forward movement of the vehicle and which controls the leaning angle of the vehicle body. Altogether, such an arrangement is very simple in its design.

The arrangement is particularly suitable for use in a three wheeled vehicle wherein the third wheel which is remote from the axle frame is supported for leaning movement with the body.

The invention and preferred features thereof will be described below in greater detail on the basis of the accompanying drawings.

BRIEF DESCRIPTION OF THE DRAWINGS

FIG. 2 is a partially sectional view of an axle frame showing the wheel support and body lean control arrangement.

DESCRIPTION OF A PREFERRED EMBODIMENT

Figure 1:
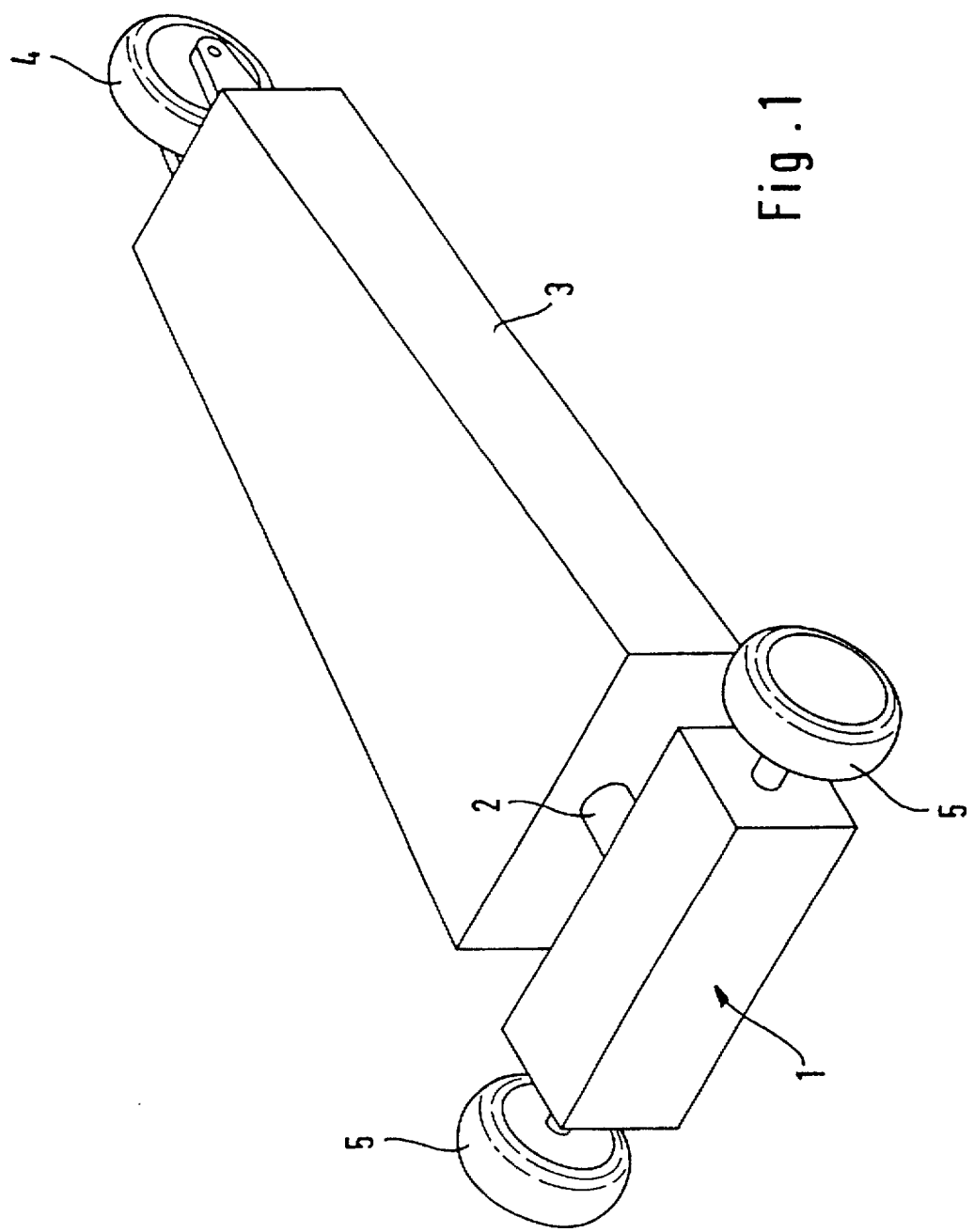
FIG. 1 is a schematic representation of a vehicle utilizing the invention.

As shown in FIG. 1, a three-wheeled curve-leaning vehicle includes a front wheel axle frame 1 on which a vehicle body 3 is supported at its front end so as to be pivotable about a longitudinal axis 2. The rear end of the body is supported by a single rear wheel 4. The wheels 5 of the axle frame 1 are steerable in the usual manner and are supported on the axle frame 1 by any suitable type of independent wheel suspension. By a controlled mounting arrangement for the spring struts of the front wheels 5, which will be described in detail below, the axle frame remains essentially level even when the vehicle is negotiating curves, that is, the axle frame 1 remains always in a position corresponding to straight ahead driving.

However, when the vehicle is negotiating a curve, the vehicle body 3 is tilted about the longitudinal axis 2 of the vehicle inwardly toward the center of the curve, such that the centrifugal forces effective on the passengers of the vehicle are fully or at least to a large extent compensated. That is when negotiating a curve the body leans like a single track vehicle such as a motorbike.

The rear wheel 4 is supported on the vehicle body 3 by a spring suspension but such that it cannot tilt about the longitudinal vehicle axis. Consequently, the rear wheel 4 tilts with the vehicle body 3, that is, at its rear end, the vehicle body tilts about the support surface area of the rear vehicle wheel 4.

As shown in FIG. 2, upper and lower control arms 6 and 7 are linked to the axle frame 1 for supporting, at their free ends, the steerable front wheels 5 (the steering mechanism with steering rack and tie rods is not shown). Wheel suspension tie rods 9 extend between the wheel ends of the upper control arms 6 and shift levers 8 mounted on the axle frame 1 for the transmission of wheel spring movements to spring members 10. The spring members 10 are in the form of spring struts and are disposed between one arm of the shift lever 8 and a common upper spring support structure 11.

The upper spring support structure 11 is arranged on a pivot lever 13 which is mounted pivotally relative to the axle frame 1 and which can be tilted sidewardly by means of an actuator 14. The actuator as shown is a hydraulically operated cylinder and piston arrangement which is automatically so controlled that it holds the pivot lever 13 during straight forward driving in an upright position as shown in FIG. 2. When the vehicle is negotiating a curve, the lever is tilted to transfer the strut forces such that the axle frame remains in its normal level position, even in curves. This is achieved actually in that the actuator 14 tilts the lever 13 toward the outside of the curve whereby the spring strut force for the outside wheel is increased and the spring strut force for the inside wheel is decreased. Assuming that in the arrangement of FIG. 2 the lever 13 is tilted to the left, the spring force applied to the shift lever 8 in a counterclockwise direction is increased which compensates for the increase in wheel forces effective in a curve on the outer wheel and accordingly compensates for any forces tending to tilt the axle frame outwardly.

The lever 13 is mechanically coupled with the vehicle body such that the vehicle body 3 leans inwardly when the vehicle is negotiating a curve.

In the arrangement as shown in FIG. 2, the pivot point 12 of the lever 13 is disposed below the longitudinal pivot axis 2 of the vehicle body 3. A pin 15 projects eccentrically, that is, below the longitudinal axis 2 from the body 3 and is received in an elongated opening 16 in the lever 13 so that it is firmly engaged by the lever 13. As a result, pivoting of the lever 13 in one direction causes tilting of the vehicle body 3 in the opposite sense, that is, pivoting of the lever toward the outside curve wheel causes inward leaning of the vehicle body 3.

What is claimed is:

1. A curve leaning vehicle having a vehicle body leaning inwardly when said vehicle is negotiating a curve, said vehicle including an axle frame on which said vehicle body is supported pivotally about a longitudinal vehicle body tilt axis, wheels independently supported on said axle frame, a tie rod extending between each wheel and a force shifting lever structure pivotally mounted on said axle frame, an upwardly projecting lever arm having a lower end pivotally mounted on said axle frame below said vehicle body tilt axis and engaging said vehicle body at a point below the vehicle body tilt axis, said lever arm having an upper end including a spring strut support structure, spring strut means supported at one end by said spring strut support structure and resiliently supporting said wheels, and an actuator engaging said lever arm for pivoting said lever arm curve-outwardly thereby tilting said vehicle body relative to said axle frame to a curve inward leaning position when said vehicle is negotiating a curve, and at the same time moving said spring strut support structure at the end of said lever arm for transferring spring forces from the inside to an outside curve wheel when said vehicle is negotiating a curve so that said axle frame remains essentially level.

2. A curve leaning vehicle according to claim 1, wherein said vehicle is a three-wheeled vehicle in which said axle frame is arranged at one end of said vehicle body and a single wheel is arranged at the opposite end, said single wheel being mounted on said vehicle body for tilting with the vehicle body.

* * * * *